United States Patent
Rudolph et al.

(10) Patent No.: US 8,503,600 B2
(45) Date of Patent: Aug. 6, 2013

(54) FUEL ELEMENT FOR A PRESSURIZED WATER REACTOR

(75) Inventors: Matthias Rudolph, Weisendorf (DE); Hans-Peter Fuchs, Nürnberg (DE); Erhard Friedrich, Eckental (DE)

(73) Assignee: Areva GmbH, Erlangen (DE)

( * ) Notice: Subject to any disclaimer, the term of this patent is extended or adjusted under 35 U.S.C. 154(b) by 1082 days.

(21) Appl. No.: 11/928,648

(22) Filed: Oct. 30, 2007

(65) Prior Publication Data

US 2008/0219398 A1    Sep. 11, 2008

Related U.S. Application Data

(63) Continuation of application No. PCT/EP2006/003729, filed on Apr. 22, 2006.

(30) Foreign Application Priority Data

Apr. 30, 2005   (DE) .......................... 10 2005 020 292

(51) Int. Cl.
   *G21C 3/34*   (2006.01)

(52) U.S. Cl.
   USPC ........... 376/438; 376/409; 376/426; 376/434; 376/462

(58) Field of Classification Search
   USPC .......................................... 376/438, 462, 433
   See application file for complete search history.

(56) References Cited

U.S. PATENT DOCUMENTS

| 4,081,324 A | * | 3/1978 | Flora et al. ..................... 376/441 |
| 4,120,751 A | * | 10/1978 | Bezold .......................... 376/441 |
| 4,124,443 A | * | 11/1978 | Bezold .......................... 376/434 |
| 5,133,927 A | | 7/1992 | Kadano et al. |
| 5,147,600 A | * | 9/1992 | Kadono et al. ................ 376/462 |
| 5,539,792 A | | 7/1996 | Büttner et al. |

FOREIGN PATENT DOCUMENTS

| DE | 2259495 | | 6/1974 |
| DE | 2605594 | A1 | 8/1977 |
| DE | 3632153 | A1 | 3/1988 |
| EP | 0664920 | B1 | 8/1995 |
| JP | 01297594 | A * | 11/1989 |

OTHER PUBLICATIONS

Wakana et al., Support Structure, Nov. 30, 1989, JP Patent Publication No. 401297594A, (Machine Translation).*
International Search Report, dated Oct. 19, 2006.

* cited by examiner

*Primary Examiner* — Jack W Keith
*Assistant Examiner* — Marshall O'Connor
(74) *Attorney, Agent, or Firm* — Laurence A. Greenberg; Werner H. Stemer; Ralph E. Locher (57) ABSTRACT

A fuel element for a nuclear reactor has a fuel rod bundle, at least one spacer with cells defined by at least one web section made from a first material and several guide tubes each running through a cell and axially fixed thereto made from a second material. The first and second materials have differing thermal expansion coefficients. The connection between the guide tube and the spacer is embodied as follows: first and second projections are directly or indirectly fixed to the guide tube. The first projections are disposed in a first axial position and the second projections are arranged at a second axial position and the projections each engage in an opening through the web section to give an axially-acting undercut.

9 Claims, 14 Drawing Sheets

FUEL ELEMENT FOR A PRESSURIZED WATER REACTOR

CROSS-REFERENCE TO RELATED APPLICATIONS

This is application is a continuation, under 35 U.S.C. §120, of copending international application PCT/EP2006/003729, filed Apr. 22, 2006, which designated the United States; this application also claims the priority, under 35 U.S.C. §119, of German patent application No. DE 10 2005 020 292.6, filed Apr. 30, 2005; the prior applications are herewith incorporated by reference in their entirety.

BACKGROUND OF THE INVENTION

Field of the Invention

The invention relates to a fuel element for a pressurized water reactor. Such a fuel element comprises a fuel rod bundle, at least one spacer with cells, for example of square shape, which are delimited by at least one web portion consisting of a first material, and a plurality of guide tubes passing in each case through a cell and consisting of a second material. The spacers are fixed axially to the guide tubes. If the spacers and guide tubes consist of zirconium alloys, connection by welding is possible. If, however, one of the components in question is manufactured from Inconel or steel and the other component from a zirconium alloy, for example Zircaloy, a welded connection is disqualified. The problem is, furthermore, that said materials have different coefficients of thermal expansion and, correspondingly, different thermal expansions. When a fuel element is heated to operating temperature, stresses at welded and soldered connections may consequently arise. Positive connections tend to be no longer exactly as firm when the fuel element is heated as in the cold state. In fuel elements known from German published patent applications DE 2 259 495 A and DE 26 05 594 (cf. U.S. Pat. No. 4,120,751), the connection between guide tube and spacer is configured such that a thermally induced relative expansion does not weaken the strength of said connection. This is achieved in that first and second projections are fixed indirectly or directly to the guide tube, a first projection being arranged in a first axial position and a second projection being arranged in a second axial position, and the projections engaging in each case into an aperture piercing a web portion.

BRIEF SUMMARY OF THE INVENTION

It is accordingly an object of the invention to provide a fuel assembly for a pressurized water reactor (PWR) which overcomes the above-mentioned disadvantages of the heretofore-known devices and methods of this general type and which provides for spacers and guide tubes consisting of materials having different thermal expansions to be connected to one another in an alternative way, specifically, in particular, such that material deformation in the region of the apertures is at least reduced.

With the foregoing and other objects in view there is provided, in accordance with the invention, a fuel element for a nuclear reactor, comprising:

a fuel rod bundle, at least one spacer formed with cells that are bounded by at least one web portion consisting of a first material, and a plurality of guide tubes each passing through a respective cell and being axially fixed to the cell and consisting of a second material having a different thermal expansion from the first material;

an assembly for connecting a respective the guide tube and the spacer, the assembly including:

first projections directly or indirectly fixed to the guide tube in a first axial position thereof and second projections directly or indirectly fixed to the guide tube in a second axial position thereof; and the first and second projections each engaging in an aperture formed in a respective the web portion, so as to form an axially effective undercut;

wherein, on occasion of a higher degree of thermal expansion of the guide tube than the web portion, those sides of the projections facing away from one another cooperate in each case with an abutment region of the apertures and, on occasion of a higher degree of thermal expansion of the web portion than the guide tube, those sides of the projections facing one another cooperate in each case with an abutment region of the apertures; and wherein the abutment region of the apertures is formed with at least one oblique edge running obliquely with respect to a longitudinal direction of the spacer or of the guide tube and, together with a projection, forming a push-and-wedge connection.

In other words, the objects of the invention are achieved by way of a connection between guide tube and spacer in which, in the event of a higher thermal expansion of the guide tubes, those sides of the projections facing away from one another and, in the event of a higher thermal expansion of a spacer or of a web portion forming its cells, those sides of the projections facing one another cooperate in each case with an abutment region of an aperture. This first ensures that, in the event of heating-induced relative movement between spacer and guide tubes, the mechanical connection between the parts does not come loose, but, on the contrary, becomes firmer, to be precise in that the projections are pressed more firmly onto the respective abutment regions of the apertures. There is therefore no need, even in the mounting state, that is to say at room temperature, to achieve the subsequent final strength required in the operating state. To be precise, a slight play present between the projection and an abutment region of the aperture after mounting disappears at the latest when the operating temperature is reached. Owing to the relative movement between spacer and guide tubes during the heating of the fuel element, a deformation of the abutment region of an aperture may occur. However, the deformation can be kept low by means of a play present at room temperature between the projections and the abutment regions. A greater material deformation in the region of an aperture is reduced or completely prevented in that an abutment region of an aperture has at least one lateral oblique edge which runs obliquely with respect to the longitudinal direction of the spacer or of a guide tube and which forms with a projection a push-and-wedge connection. With an increasing relative movement between spacer and guide tubes, this type of connection becomes firmer under increasing heating on account of the wedge action. By the amount of obliquity of the oblique edges, adaption to more or less pronounced differences in the thermal expansion behavior of the materials combined with one another can be carried out. The deformation of a web portion in the aperture margin region can also be counteracted in that a projection is configured with an oblique surface cooperating with the oblique region. As a result, the mutual bearing surface is enlarged, and, correspondingly, the forces acting on an oblique edge are distributed. The lower surface pressure achieved thereby has the effect of a correspondingly lower deformation of a web portion in the region of the oblique edge.

In a further preferred refinement, there is provision for the oblique surface of a projection to have additionally an obliquity in the radial direction and to engage at least partially behind the oblique edge of an aperture in the circumferential direction, the web portion being acted upon by a radially inward-acting force component during a relative movement between web portion and guide tube. Thus, during a relative movement between spacer and guide tube, a web portion is pressed against the circumferential surface of the guide tube by virtue of the force action. Moreover, a web portion is prevented from curving radially outward by overcoming the axially effective undercut between projection and aperture.

In principle, it is conceivable to provide the projections directly on the guide tube, and to press these radially out of the circumferential surface with the aid of a mandrel tool. In a preferred refinement, however, there is provision for the projections not to be connected directly to the guide tube, but, instead, to be carried by an upper and a lower sleeve which are pushed over a guide tube and surround the latter, fixed axially, in the region of a spacer. The fixing of the sleeve on the guide tube preferably takes place by means of welding, which presupposes that the sleeves and guide tubes consist of materials weldable to one another, for example both of stainless steel. Mounting is made easier by sleeves carrying the projections. The sleeves are first fixed on the top side and on the underside to a spacer by being plugged into a cell until the projections latch into the apertures of the web portions. A guide tube is subsequently plugged through the sleeves fixed to the spacer. Since the projections are to pass with an axially effective undercut through an aperture, the wrench size of two diametrically opposite projections is necessarily greater than the clear width of a, for example, square spacer cell. In order to make it possible to introduce a sleeve into a cell, therefore, the web portions would first have to be widened radially outward. In a preferred refinement, then, there is provision for the projections not to be arranged directly on the outer circumference of the sleeve, but, instead, on the outside of arms which extend axially away from that end face of a sleeve which faces the spacer. During mounting, the arms can be pressed radially inward, so that the sleeve can be introduced, with its arms in front, into a cell. When the projections have reached the apertures, the arms spring radially outward, the projections engaging behind the apertures.

In a further preferred refinement, there is provision for a spacer to have rectangular cells formed by four web portions, and for four arms oriented in each case centrally with respect to a web portion to be present on a sleeve, the web portions having a radially widened reception region extending axially away from their upper margin and a radially widened reception region extending axially away from their lower margin, into which reception region the arm assigned to it extends axially and radially and engages with its projection into an aperture.

In another preferred refinement, a spacer with rectangular cells formed by four web portions is likewise present. However, the sleeve is arranged such that its four arms are oriented in each case toward the cell corner regions. An upper and a lower aperture is provided in the cell corner region of each web portion, the projection of an arm engaging simultaneously into two upper and two lower apertures. The advantage of this refinement is, for example, that a web portion is more stable in the cell corner region than in its middle portion and accordingly better withstands forces exerted by a projection in the operating state, in particular without pronounced deformations or distortions. It is advantageous, furthermore, that the middle portion of a web portion remains free and this space may serve, for example, for arranging a spring element serving for the radial support of a fuel rod.

Other features which are considered as characteristic for the invention are set forth in the appended claims.

Although the invention is illustrated and described herein as embodied in fuel element for a pressured water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
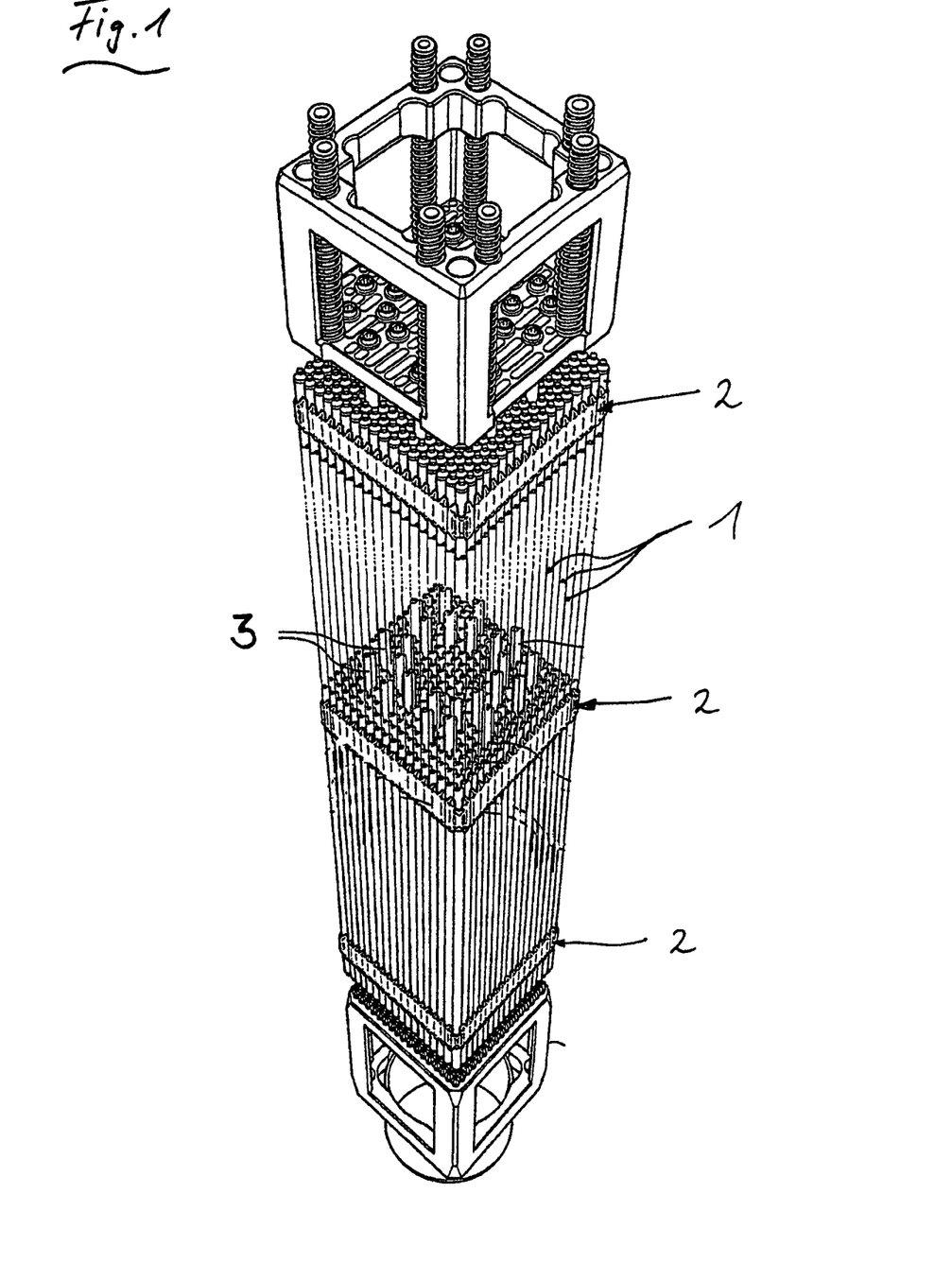
FIG. 1 shows a fuel element of a pressurized water reactor in a perspective view.

Referring now to the figures of the drawing in detail and first, particularly, to FIG. 1 thereof, a fuel element of a pressurized water reactor comprises a bundle of a multiplicity of fuel rods 1 which are held laterally by a plurality of spacers 2.

The fuel element 1 comprises, furthermore, a plurality of guide tubes 3. The guide tubes 3 and the spacers 2 consist of different materials which cannot be welded to one another and which have different coefficients of thermal expansion and thermal expansion behavior. In the exemplary embodiments according to FIGS. 2, 4 and 8, the guide tubes consist of a material with a higher thermal expansion than the material of the spacers. The guide tubes 3 consist of stainless steel or of a nickel alloy, for example Inconel®, and the spacers 2 consist of a zirconium alloy, for example Zircaloy. In the exemplary embodiment of FIG. 2A, the circumstances are reversed. Here, the spacers have the higher thermal expansion, that is to say consist, for example, of Inconel or stainless steel. By contrast, the guide tubes 3 are manufactured from Zircaloy or the like. In all the exemplary embodiments, a spacer is composed essentially of webs 4 arranged crosswise, a cell 5 of a spacer being formed by four web portions 6. The spacers 2 are fixed in the axial direction to the guide tubes 3. For this purpose, in each case four first projections 7 and second projections 8 project radially in an upper axial position I and in a lower axial position II. The projections 7, 8 are spaced apart uniformly in the circumferential direction and are formed by a radially outward-directed embossing of the tube wall of the guide tube 3. The first and second projections 7, 8 have the same rotary position with respect to one another and are, for example, of boss-shaped design. The projections 7, 8 are arranged within a cell and pass, so as to form an axially effective undercut, through apertures 9 piercing the web portions 6.

Figure 2:
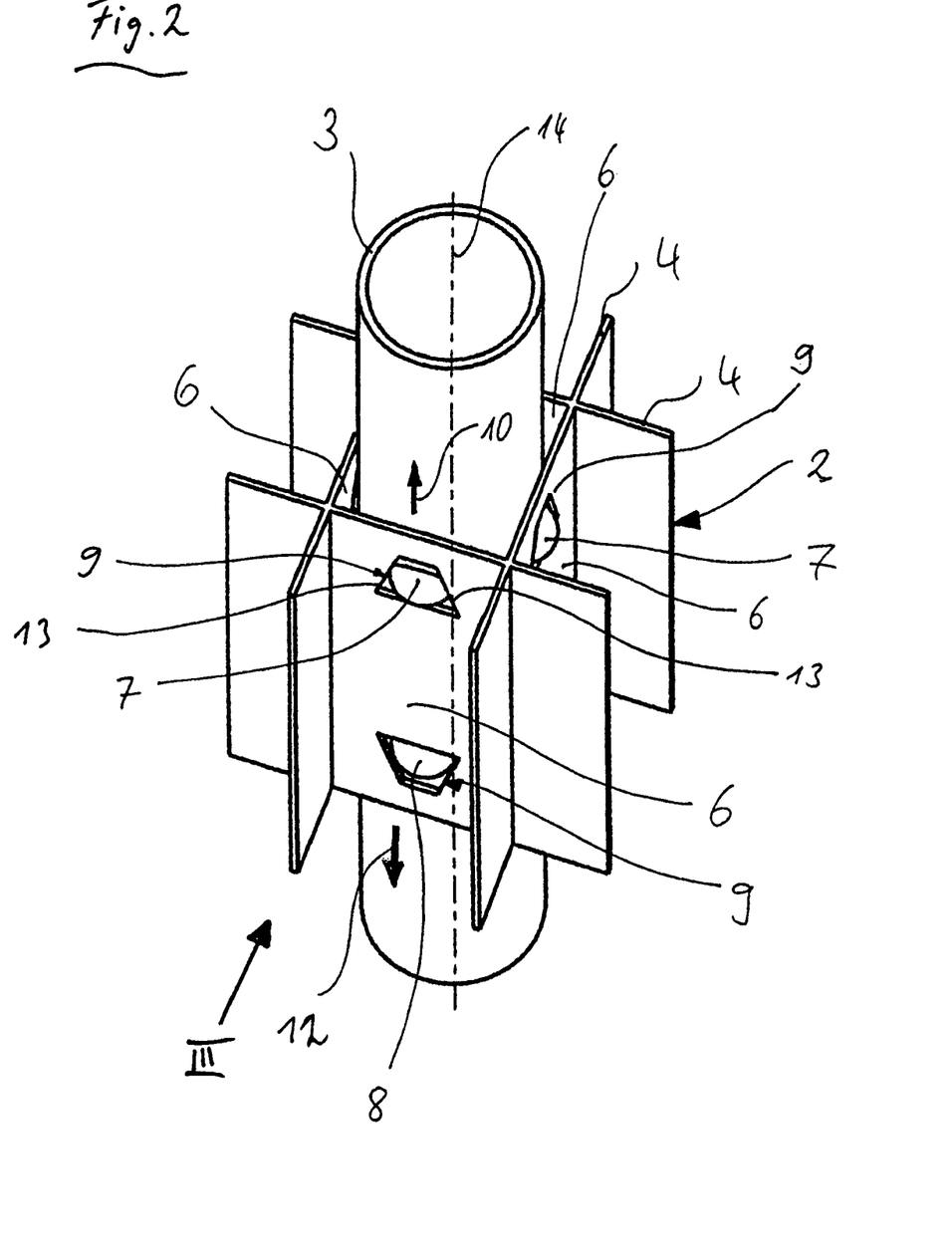
FIG. 2 shows a detail of a first exemplary embodiment in a perspective illustration.

During heating to operating temperature, the material of the guide tubes 3 expands to a greater extent than the zirconium alloy of the spacers 2. This results, in terms of the upper axial position I, in a relative movement of the first projection 7 with respect to the web portions 6 upward or in the direction of the arrow 10 and, in terms of the lower axial position, in a relative movement downward or in the direction of the arrow 12. The projections 7, 8 are in this case pressed against an abutment region, which, in the present case, is formed by oblique edges 13 of the apertures 9. The oblique edges 13 are oriented obliquely with respect to the longitudinal mid-axis 14 of the guide tube 3. The oblique edges 13 of axial position I in this case form an acute angle open in the direction of the arrow 12 and those of axial position II form an acute angle open in the direction of the arrow 10. With an increasing relative movement of the guide tube 3 in the direction of the arrows 10 and 12, the projections 7, 8 are pressed with their sides pointing in the direction of the arrows 10 and 12 against the oblique edges 13 of the apertures 9. The projections 7, 8 cooperate with the oblique edges 13 with the effect of a push-and-wedge connection. With an increasing relative thermal expansion of the guide tubes 3, a projection 7, 8 is noticeably pressed into the narrowed region of the apertures 9. The connection between spacer and guide tube 3 thus becomes firmer under heating.

Figure 2A:
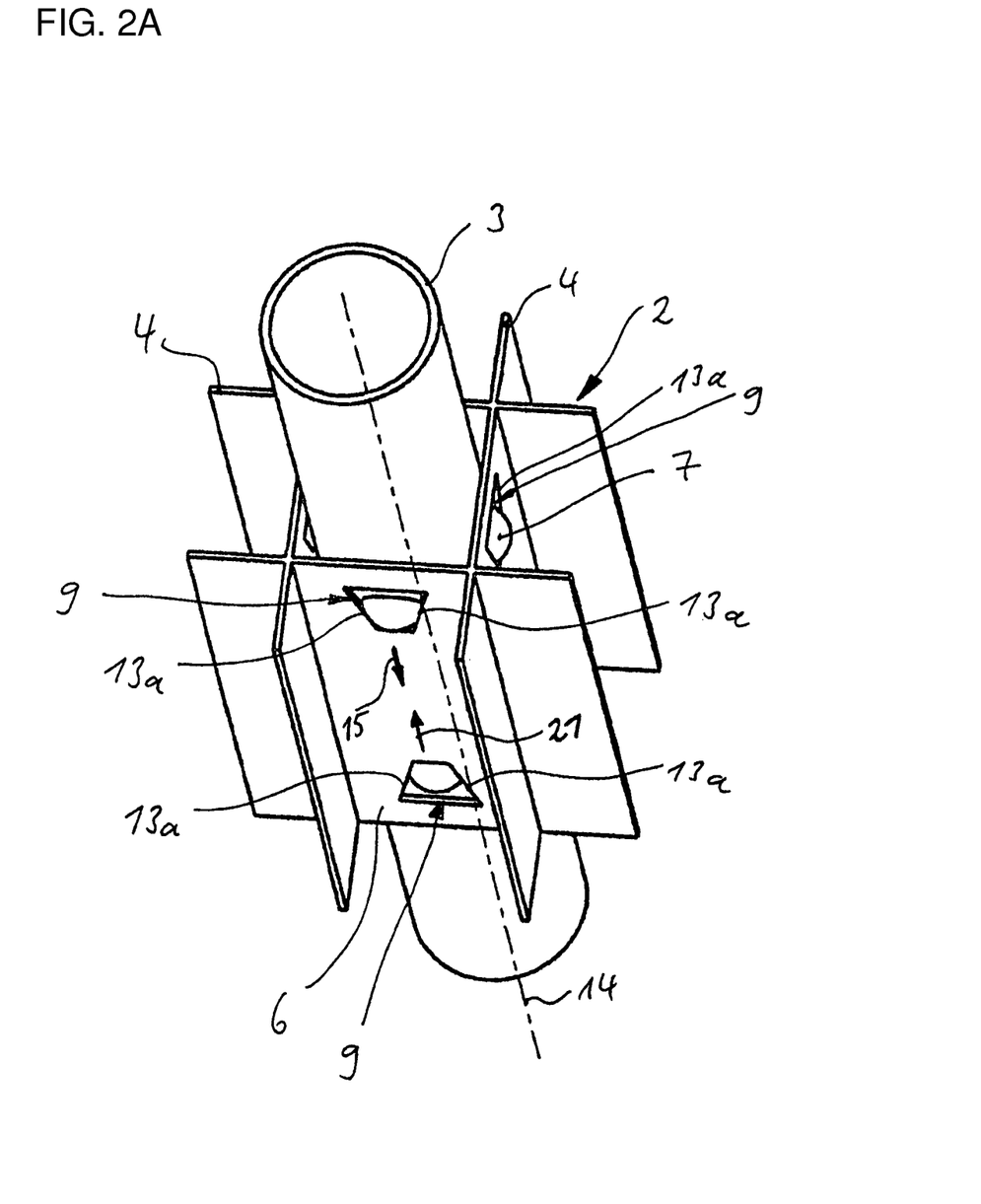
FIG. 2A shows a modification of the exemplary embodiment of FIG. 2.
Figure 3:
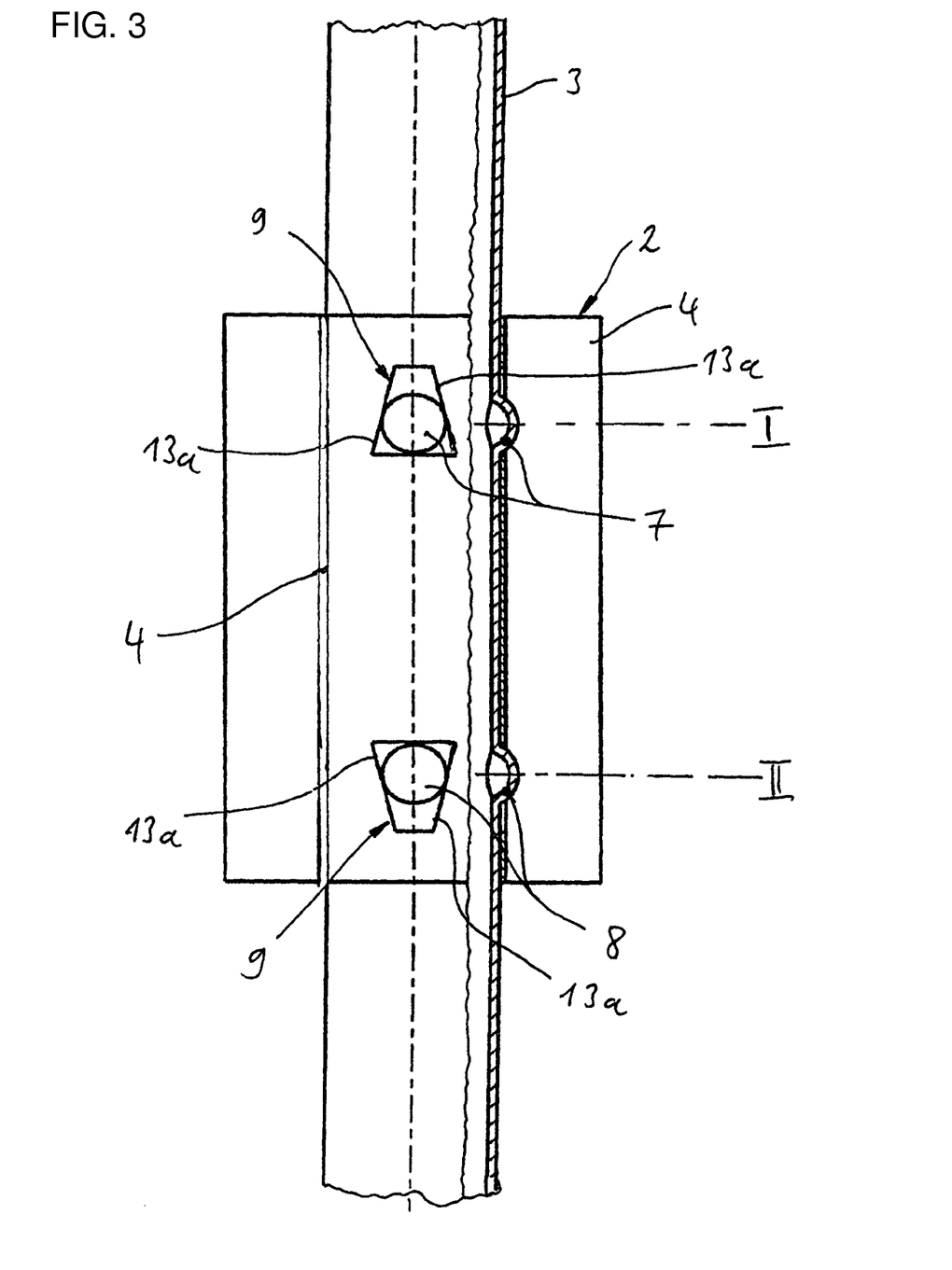
FIG. 3 shows a partially cut away top view in the direction of the arrow III in FIG. 2.

The exemplary embodiment of FIG. 2A differs from that according to FIG. 2 in that the material of the guide tube has a lower thermal expansion than the material of the spacer. The guide tube 3 consists, for example, of Zircaloy, whereas the spacer consists of Inconel or stainless steel. During heating to operating temperature, the expansion conditions are reversed. The projections 7 of upper axial position I execute a relative movement with respect to the spacer 3 downward or in the direction of the arrow 15 and the projections 8 of lower axial position II execute a relative movement upward or in the direction of the arrow 21. With the longitudinal mid-axis 14 of the guide tubes 3, the oblique edges 13a of the upper apertures 9 form an acute angle open upward or in the direction of the arrow 21 and the side edges 13a of the lower apertures 9 form an acute angle open downward or in the direction of the arrow 15. A different thermal expansion between guide tube and spacer 2 thus has the effect that the apertures 9 are pressed with their two oblique edges 13a against the projections 7, 8.

Figure 4:
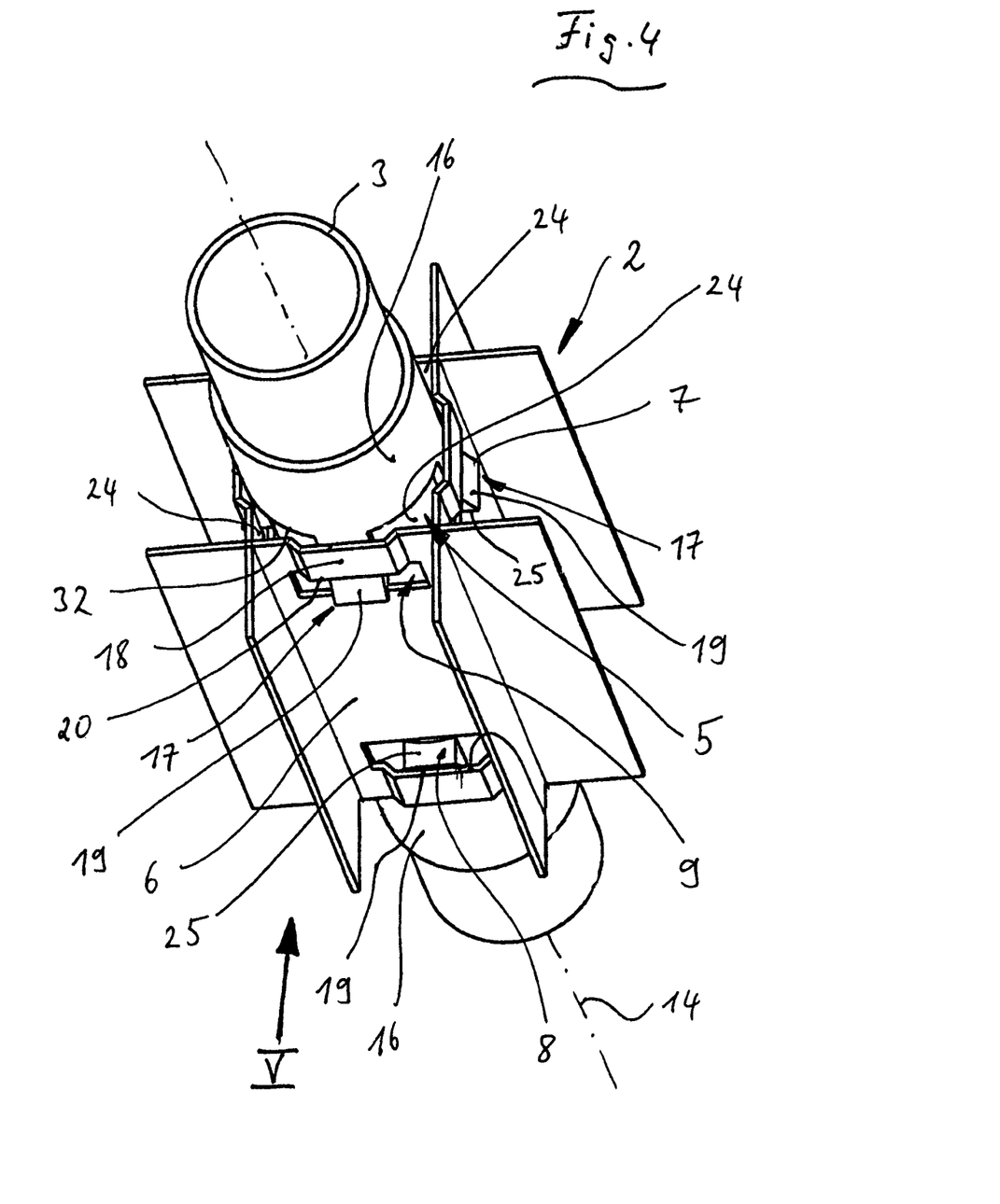
FIG. 4 shows a detail of a second exemplary embodiment in a perspective view.
Figure 5:
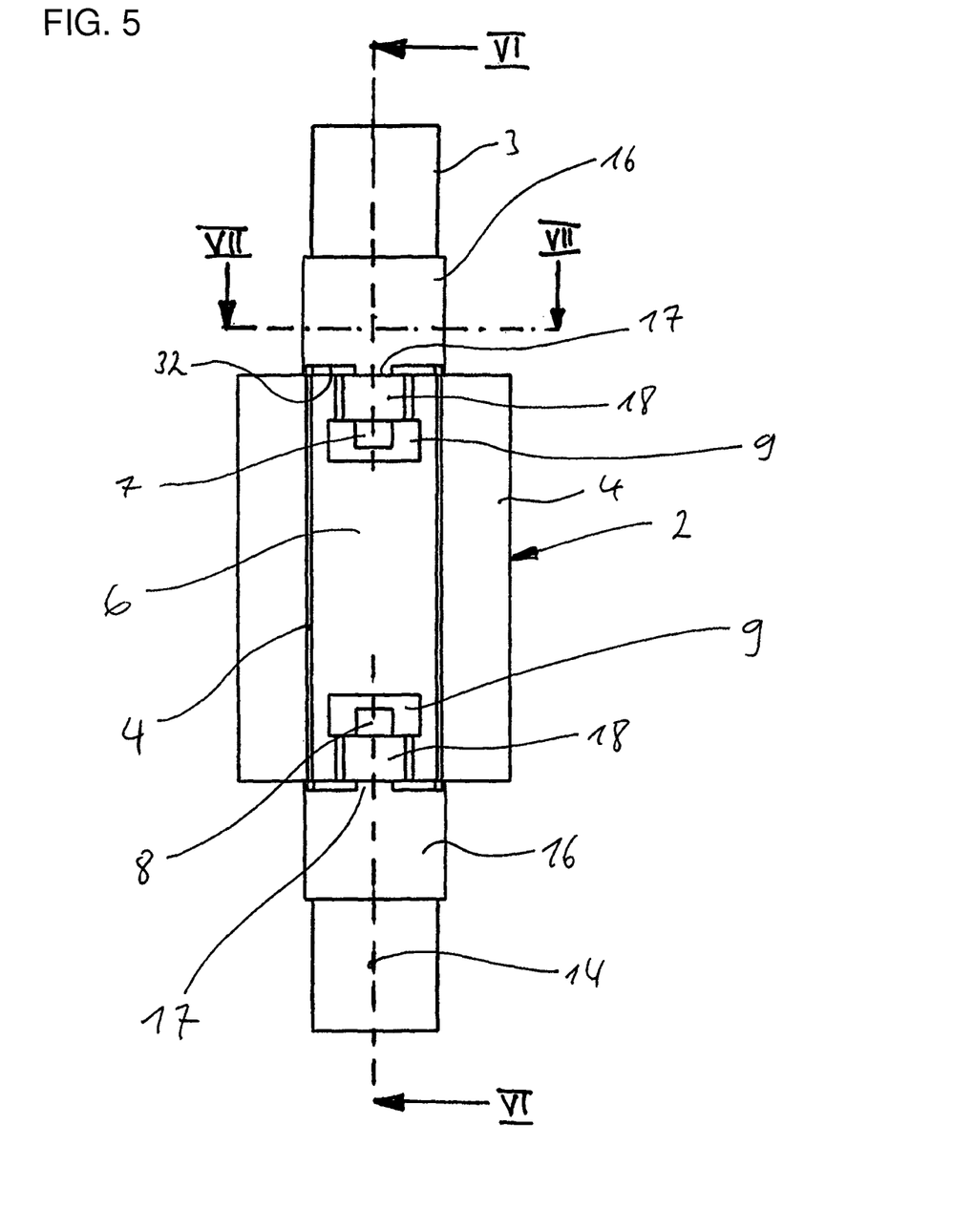
FIG. 5 shows a top view in the direction of the arrow V in FIG. 4.
Figure 8:
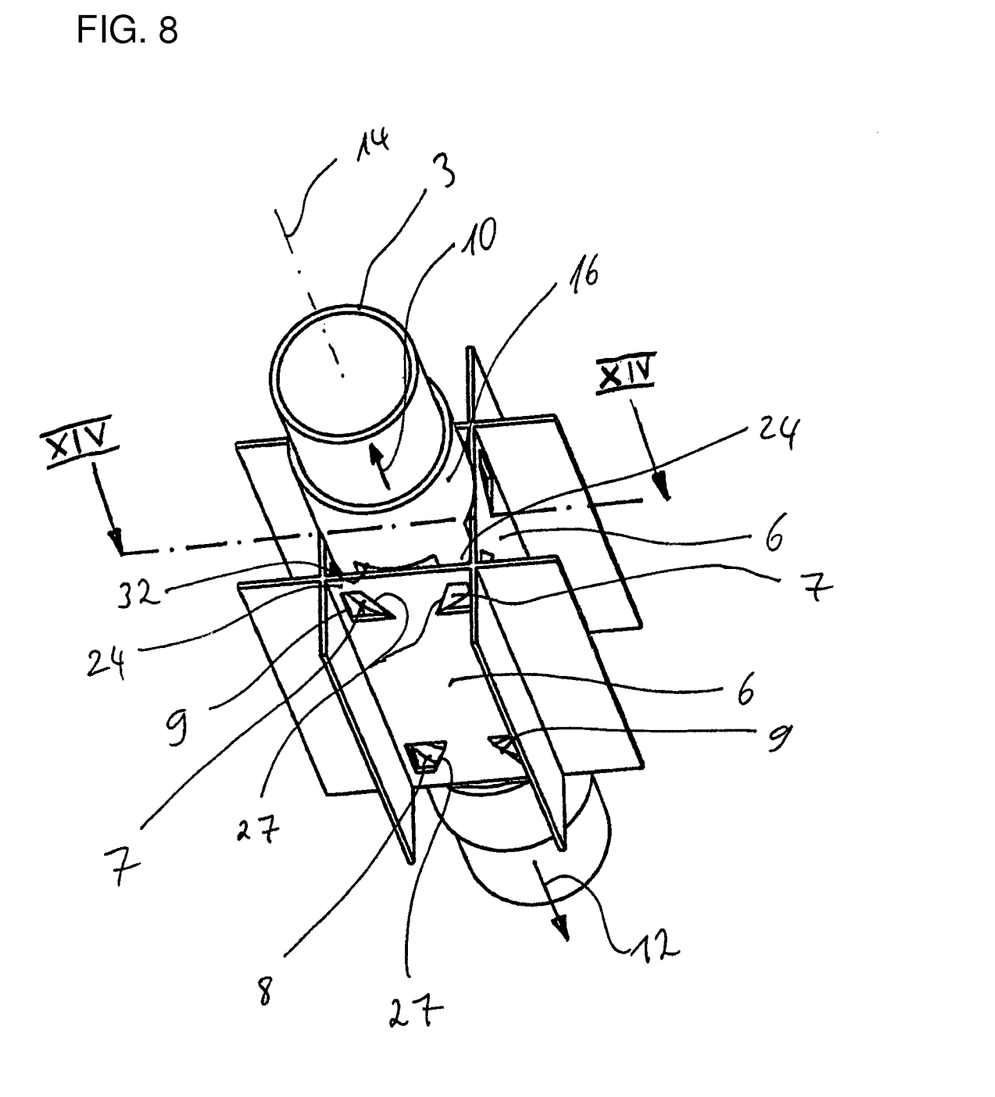
FIG. 8 shows a detail of a third exemplary embodiment in a perspective illustration.
Figure 9:
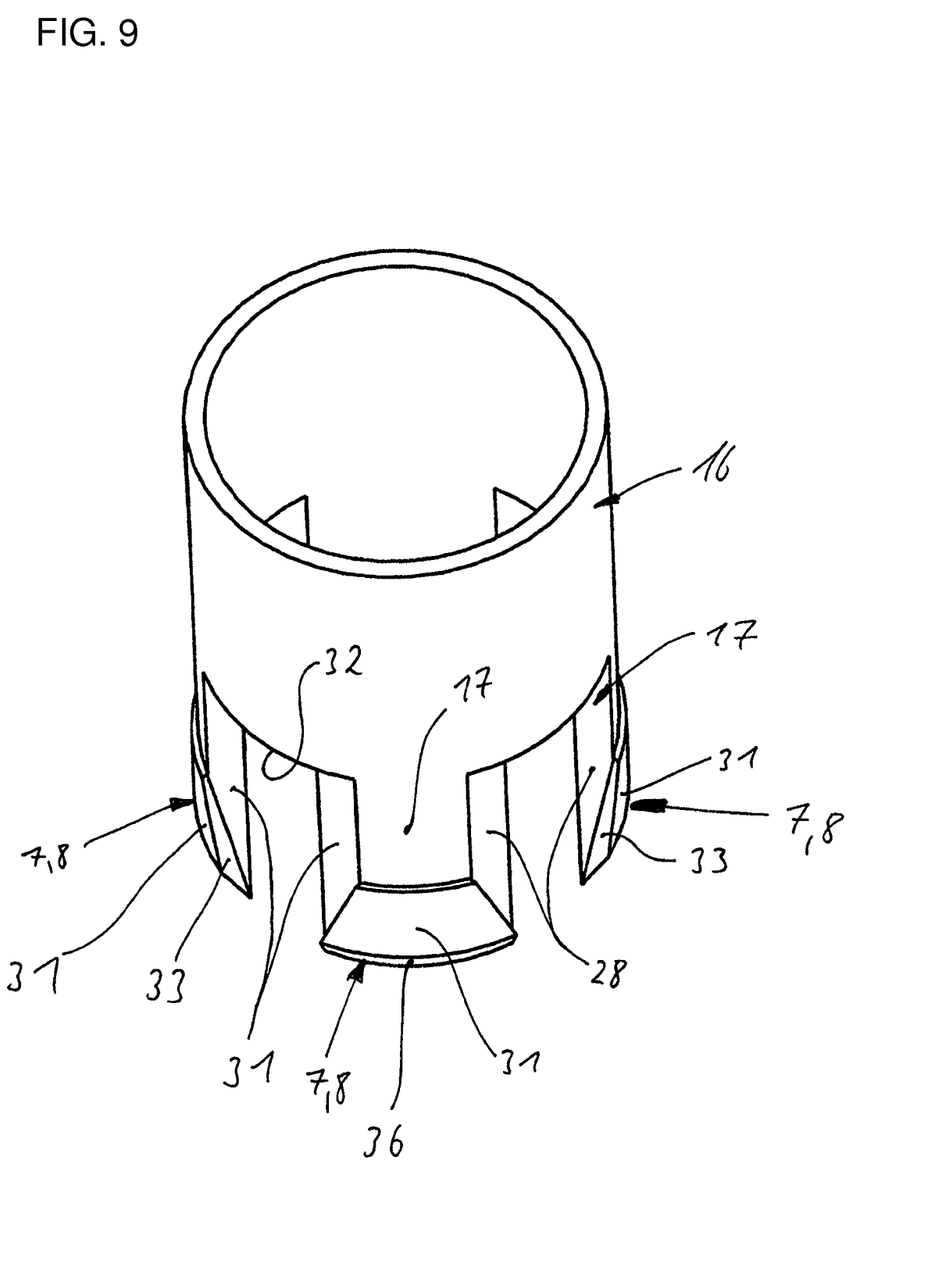
FIG. 9 shows a sleeve in a perspective illustration.
Figure 10:
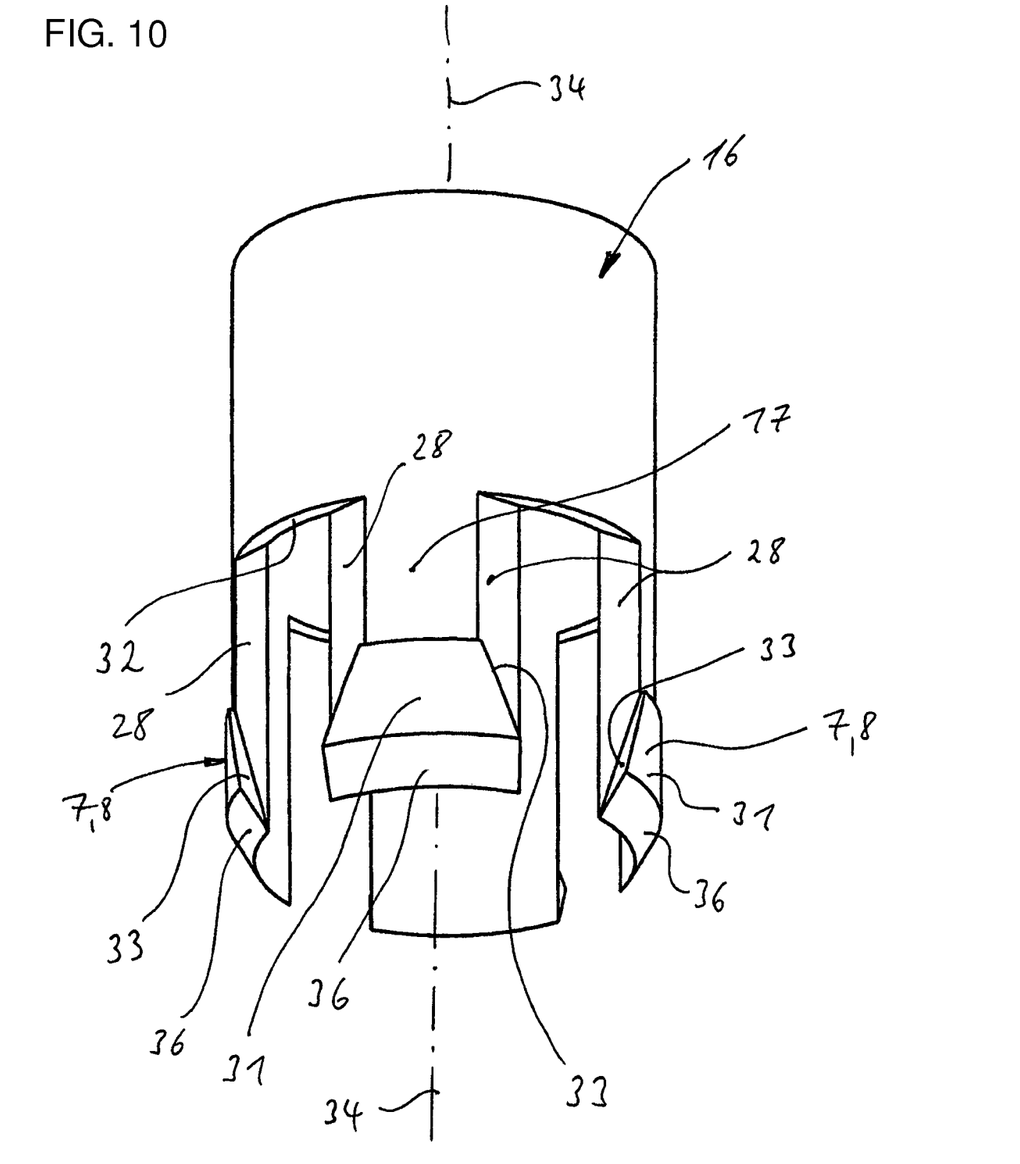
FIG. 10 shows the sleeve of FIG. 9 in a second perspective illustration.
Figure 11:
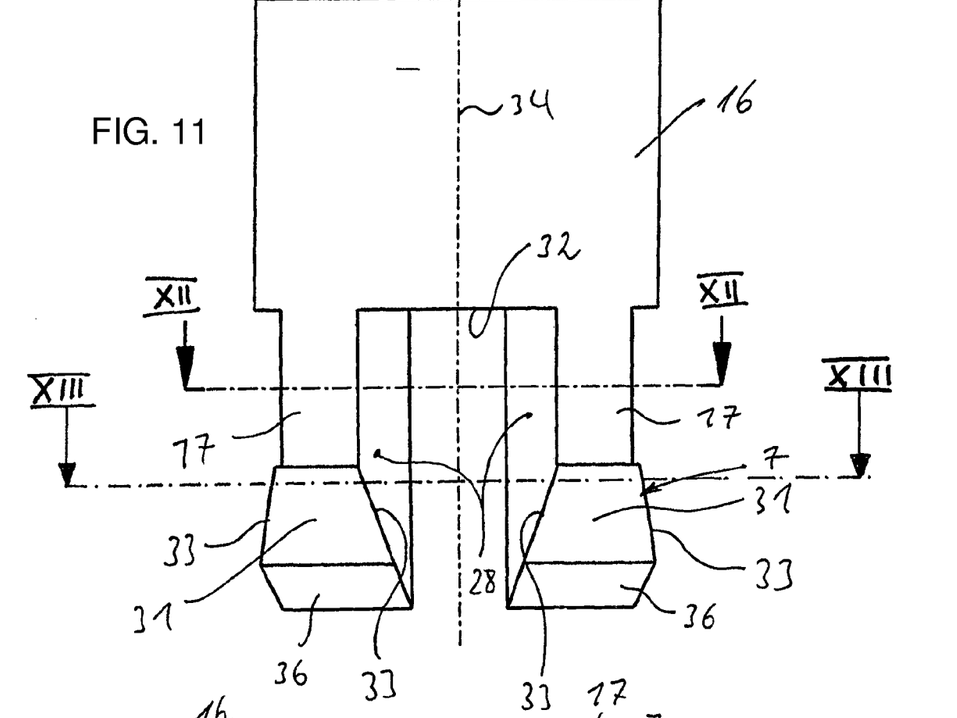
FIG. 11 shows a side view of the sleeve of FIG. 9.
Figure 12:
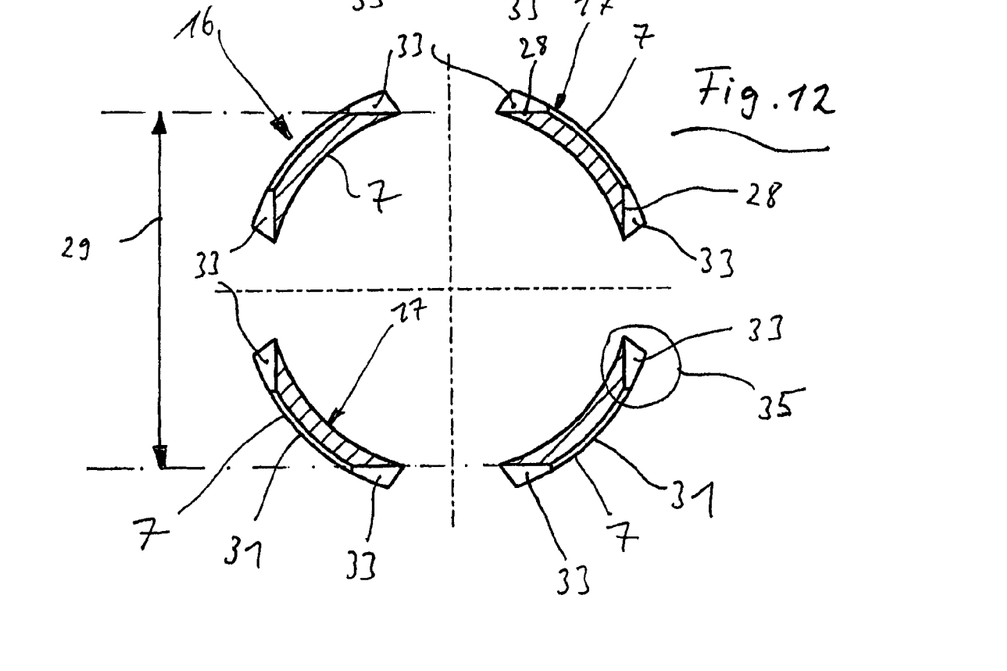
FIG. 12 shows a cross section along the line XII-XII in FIG. 11.
Figure 13:
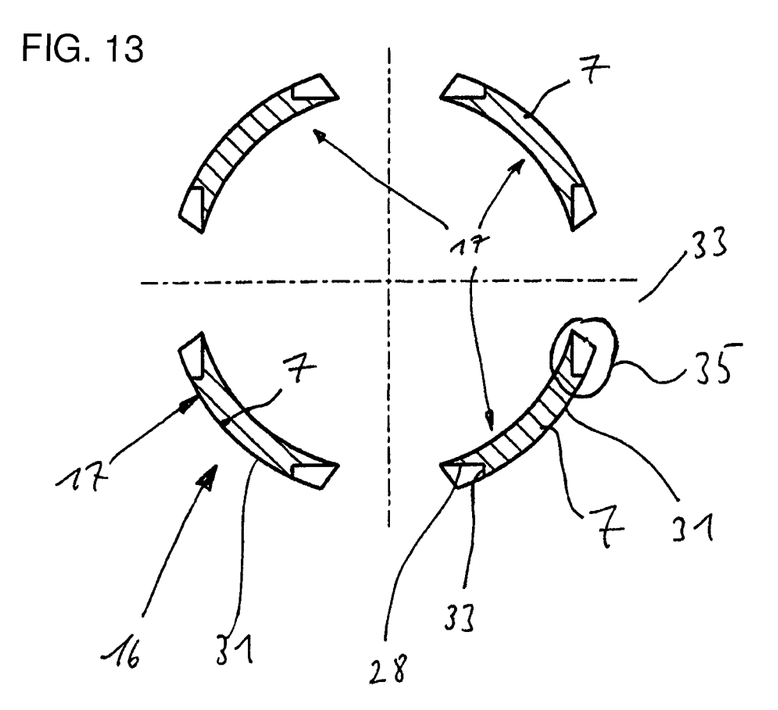
FIG. 13 shows a cross section along the line XIII-XIII in FIG. 11.
Figure 14:
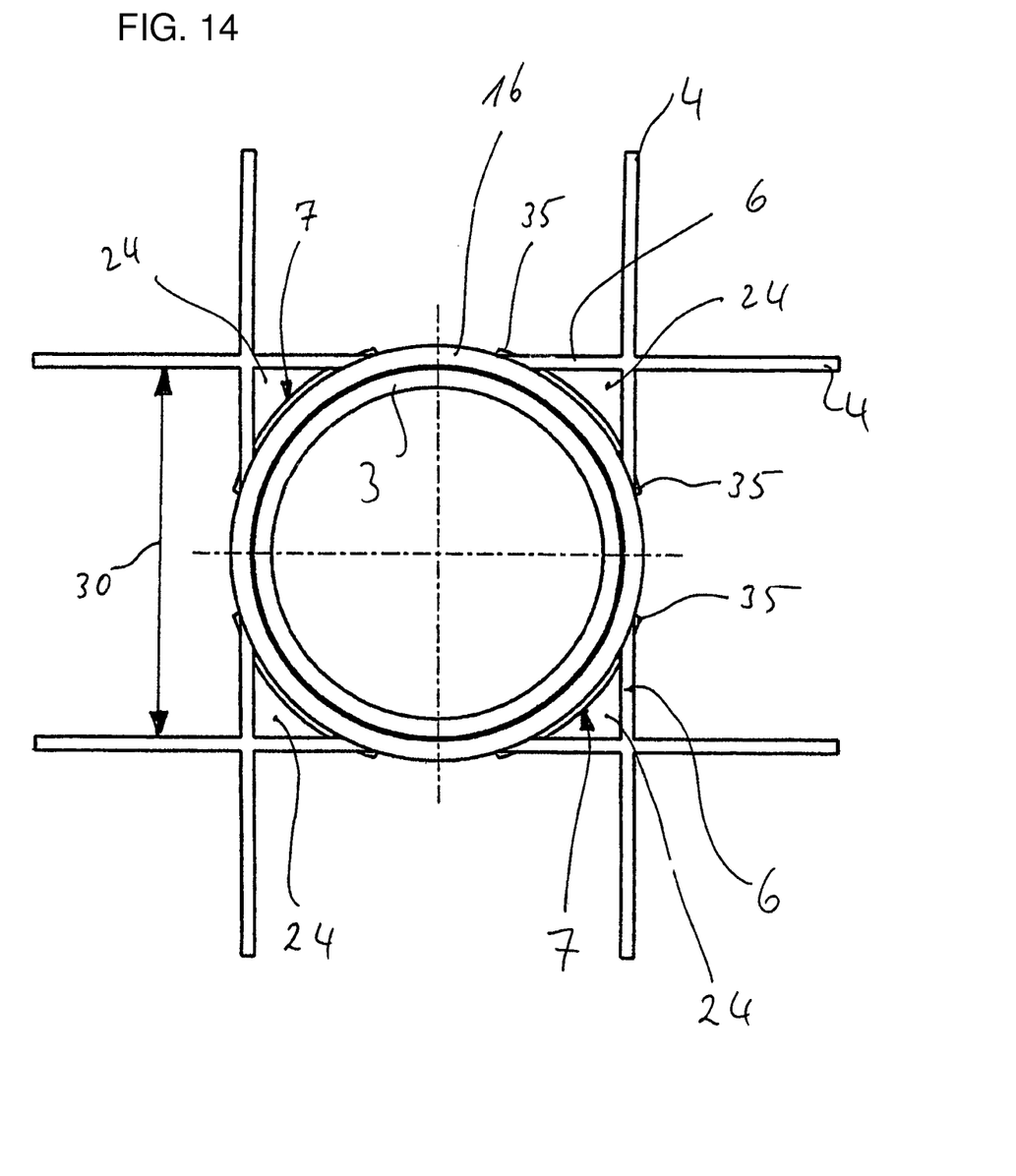
FIG. 14 shows a cross section along the line XIV-XIV in FIG. 8.

In the exemplary embodiments of FIGS. 4 and 8, the first and second projections 7, 8 are connected indirectly to the guide tube 3. In the region adjacent to a spacer 2 on the top side and on the underside, the guide tube is in each case fixed axially and surrounded, essentially free of play, by a sleeve 16. The sleeves 16 are fixed to the guide tube 3 by welding and likewise consist, for example, of Inconel or stainless steel or of a material weldable to these materials. Arms 17 are integrally formed onto the end face 32 of the sleeves 16 which faces the spacer 2 and extend away in the axial direction. The arms 17 are cut free from the sleeve wall and at their free end carry the projections 7, 8 which project radially from their outsides. The insides of the arms 17 are curved correspondingly to the inner wall of the sleeve 16 and accordingly, in the mounting state, bear against the circumferential surface of the guide tube 3.

In the exemplary embodiment of FIG. 4, the sleeves 16 are in a rotary position with respect to a cell 5 of the spacer 2 such that their arms are arranged approximately centrally with respect to a web portion 6. The upper and the lower region of the web portions 6 which in each case faces a sleeve 16 is widened radially outward and forms a reception region 18 into which the arms 17 extend axially and radially. The width of the reception region 18 is greater than the width of the arms 17. The web portions 6 are pierced below and above the reception region 18 by an aperture 9. The latter has a rectangular cross-sectional shape and extends with its longitudinal direction transversely with respect to the longitudinal direction of the fuel element 1 or transversely with respect to the longitudinal mid-axis 14 of the guide tube 3. The projections 7, 8 integrally formed onto the free ends of the arms 17 are wedge-shaped in longitudinal section, and they have an oblique surface 19 pointing away from the circumferential surface of the guide tubes 3 and extending tangentially with respect to this. The projections 7, 8 pass through the apertures 9 and bear with their oblique surface 19 against the inner edge 20 of the reception regions 18. The reception region 18 or the inner edge 20 and the oblique surface 19 likewise cooperate with the effect of a push-and-wedge connection. In the event of thermally induced expansion of the guide tube 3, the projections 7, 8 or their oblique surfaces 19 move in the direction of the arrows 10 and 12. In this case, the oblique surfaces 19 are pushed onto the inner edges 20, thus leading, with increasing heating, to a consolidation of the connection between guide tube 3 and spacer 2.

Figure 6:
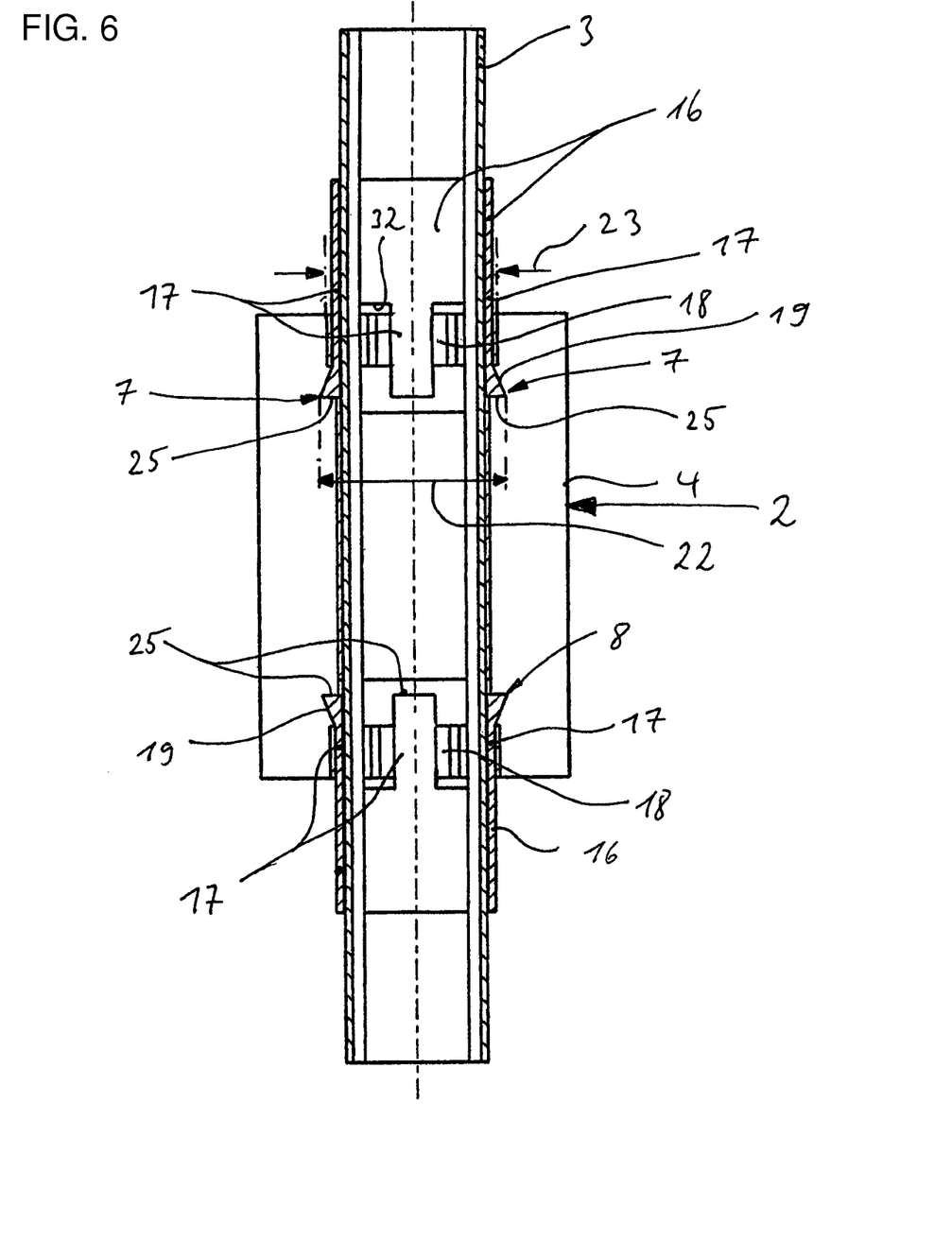
FIG. 6 shows a longitudinal section along the line VI-VI in FIG. 5.
Figure 7:
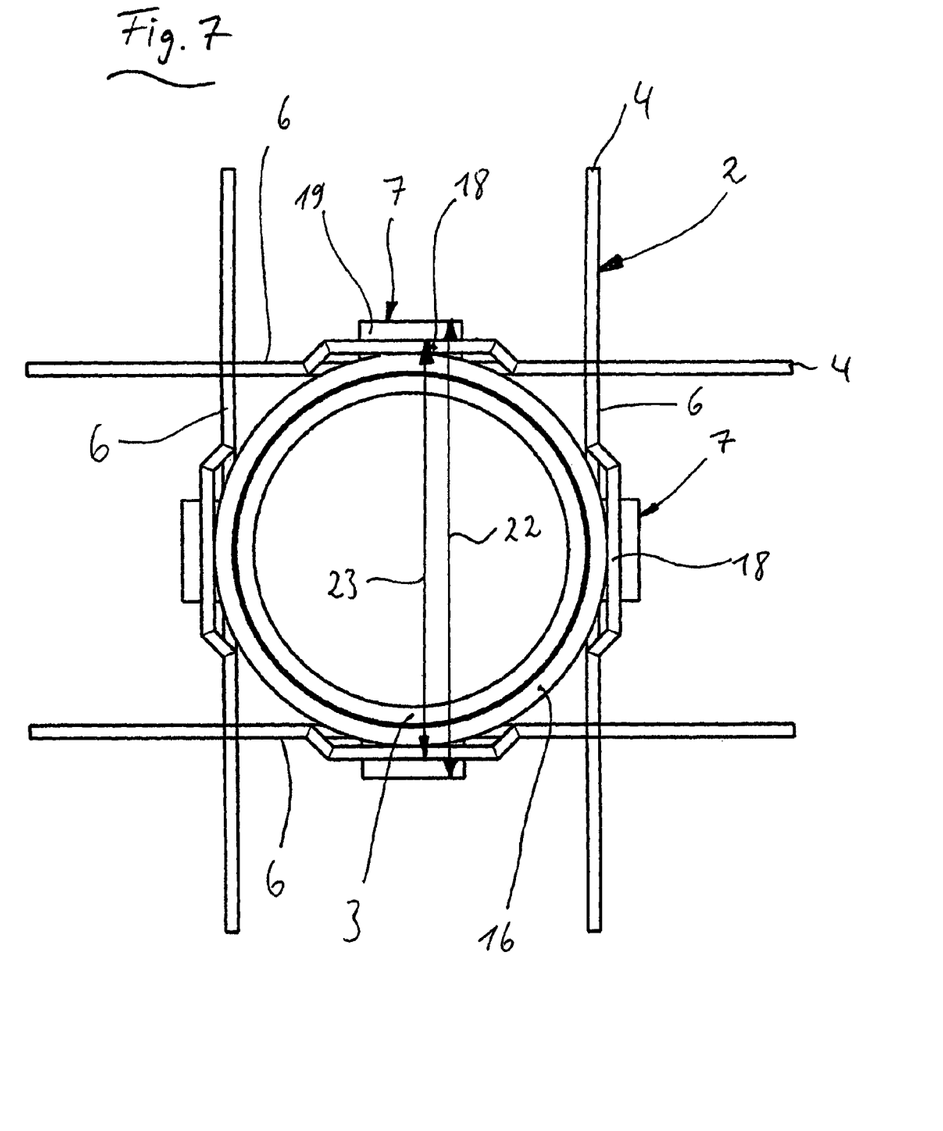
FIG. 7 shows a cross section along the line VII-VII in FIG. 5.

For mounting, first, the two sleeves 16 are plugged on the top side and on the underside onto a spacer. Since the wrench size 22 (FIG. 6) of two diametrically opposite projections is greater than the wrench size 23 of two diametrically opposite reception regions 18, the arms 17 must be bent radially inward before a sleeve 16 is plugged into the spacer 2. Another possibility for allowing the sleeves 16 to be plugged in is to select the width of the arms 17 such that these are accommodated in cell corner regions 24 of the spacer 2. The sleeves 16, when plugged in, are thus held in a position rotated at 45° with respect to their desired rotary position. After the sleeves 16 have approximately reached their axial desired position, the sleeve is rotated through 45°, the projections 7, 8 engaging into the apertures 9. In order to make this easier, it is expedient for the apertures 9 to project into the cell corner regions 24. In order to make it easier to plug the sleeves 16 into a spacer 2, it is conceivable to configure the end faces 25 of the projections 7, 8 as run-on slopes, these cooperating with the outer edge of a web portion 6 or of a reception region 18, with the result that an arm 17 is bent radially inward and it is possible for the sleeve 16 to be plugged into a cell 5.

FIGS. 8 to 13 illustrate an exemplary embodiment in which a fixing of a spacer 2 having square cells 5 to a guide tube 3 takes place with the aid of sleeves 16, on whose end face 32 facing the spacer 2 arms 17 project axially. Here, too, the arms 17 are cut free from the sleeve wall and at their free end carry a projection 7 and 8 on the outside. In the mounting state, the arms 17 extend into the cell corner regions 24 of the spacer 2.

An aperture 9 is arranged in each case in upper axial position I and in lower axial position II in each cell corner region 24 of a web portion 6. A web portion 6 is thus pierced overall by four apertures 9. The abutment region of the apertures 9 which cooperates with the projections 7, 8 is formed by the inner edges, designed as oblique edges 27, of the apertures. An oblique edge 27 forms with the longitudinal mid-axis 14 of a guide tube 3 an acute angle opening upward (arrow 10) or downward (arrow 12). The projection 7, 8 of an arm 17 engages simultaneously into two upper and two lower apertures of a cell corner region 24.

The more detailed configuration of a sleeve 16 and, in particular, of the projections 7, 8 may be gathered best from FIGS. 9 to 12. The side surfaces 28 of the arms 17 do not extend in the radial direction, but in the tangential direction, with respect to the circumferential surface of the sleeve 16. As may be gathered particularly from FIG. 12, the side surfaces 28 form overall a square, the wrench size 29 of which is slightly smaller than the clear width 30 of a cell 4. A sleeve 16 can be plugged into a spacer 2 at most until its end face 32 carrying the arms 17 sits on the webs 4 or the web portions 6. The projections 7, 8 are thickenings which resemble essentially an annular bead and which project radially from the outside of the arms 17. The outside 31 of the projections 7, 8 is part of a cylinder surface which coaxially surrounds the circumferential surface of the sleeves 16. The side surfaces of the projections 7, 8 are designed as oblique surfaces 33 which with the longitudinal mid-axis 34 of a sleeve 16 or the longitudinal mid-axis 14 of a guide tube 3 form an acute angle opening upward (arrow 10) or downward (arrow 12). In the mounting state, the projections 7, 8 pass with their side regions 35 through two apertures 9 adjacent to a cell corner region 24. In this case, the oblique surfaces 33 of the projections 7, 8 cooperate with the oblique edges 27 of the apertures 9 with the effect of a push-and-wedge connection. So that the arms 17 fit with the projections 7, 8 into the cell corner regions 24, the projections 7, 8 should not project too far from the outer circumferential surface of the sleeve 16. The radial extent of the oblique surfaces 33 is therefore relatively small, so that there is the risk that, in the event of heating-induced expansion of the guide tubes 3, an oblique surface 33 comes out of engagement with the oblique edge 27. In to prevent this, the oblique surfaces 33 are oriented, as seen in a radial plane, such that, during a relative movement between guide tube 3 and web portion 6 in the direction of the arrow 10 or 12, a projection 7, 8 exerts a radially inward-directed force component on an oblique edge 27. The strength of the connection between guide tube 3 and spacer 2 is thus consolidated in the heated state not only in the axial direction, but also in the radial direction.

Mounting takes place, for example, as already described above. The sleeves 16 are plugged on the top side and on the underside into a cell, the arms 17 being oriented toward the cell corner regions 24. In order to facilitate the radial inwardly directed bending of the arms 17, their end face is designed as a run-on slope 36.

The invention claimed is:

1. A fuel element for a nuclear reactor, comprising:
a fuel rod bundle, at least one spacer formed with cells that are bounded by at least one web portion consisting of a first material, and a plurality of guide tubes each passing through a respective cell and being axially fixed to said cell and consisting of a second material having a different thermal expansion from the first material;
an assembly for connecting a respective said guide tube and said spacer, said assembly including:
first projections directly or indirectly fixed to said guide tube in a first axial position thereof and second projections directly or indirectly fixed to said guide tube in a second axial position thereof; and
said first and second projections each engaging in a respective aperture formed in a respective said web portion, so as to form an axial support;
wherein, on occasion of a higher degree of thermal expansion of said guide tube than said web portion, said projections having sides facing away from one another cooperate in each case with an abutment region of said apertures and, on occasion of a higher degree of thermal expansion of said web portion than said guide tube, said projections having sides facing one another cooperate in each case with an abutment region of said apertures; and
wherein said abutment region of said apertures is formed with at least one oblique edge running obliquely with respect to a longitudinal direction of said spacer or of said guide tube and, together with a projection, forming a push-and-wedge connection, and said abutment regions corresponding to said first projections and said abutment regions corresponding to said second projections being disposed spaced apart from one another in an axial direction of said guide tube.

2. The fuel element according to claim 1, wherein a respective one of said projections has an oblique surface cooperating with said oblique edge.

3. The fuel element according to claim 2, wherein said oblique surface has an additional obliquity in a radial direction and engages behind said oblique edge in a circumferential direction, such that, during a relative movement between said web portion and said guide tube, said web portion is acted upon by a radially acting force component.

4. The fuel element according to claim 1, wherein said guide tube is surrounded, fixed axially, in a region of said spacer by an upper and a lower sleeve, said upper sleeve carrying said first projections and said lower sleeve carrying said second projections.

5. The fuel element according to claim 4, which comprises a plurality of arms extending axially away from an end face of one of said sleeves facing said spacer, wherein said first and second projections are disposed on the outsides of said arms.

6. The fuel element according to claim 5, wherein an inside of said arms bears against a circumferential surface of said guide tube.

7. The fuel element according to claim 5, wherein said spacer has rectangular cells each formed by four web portions, and four arms each oriented centrally with respect to a web portion are present on a sleeve, said web portions having a radially widened reception region extending axially away from an upper margin of said web portions and a radially widened reception region extending axially away from a lower margin of said web portions, and wherein a respective said arm assigned to one of said reception regions extends axially and radially and engages with said projection into an aperture.

8. The fuel element according to claim 5, wherein said spacer has rectangular cells each formed by four web portions, and four arms each oriented toward corner regions of said cells are present on a sleeve, and wherein an upper and a lower aperture are provided in the cell corner region of each web portion, and said projection of an arm engaging simultaneously into two upper and two lower apertures of a cell corner region.

9. The fuel element according to claim 1, wherein said first projections and said second projections are circumferentially aligned with one another on said guide tube.

* * * * *